US012671530B2

(12) United States Patent
Qiu et al.

(10) Patent No.: US 12,671,530 B2
(45) Date of Patent: Jun. 30, 2026

(54) CARRIER AGGREGATION METHOD AND APPARATUS, AND ELECTRONIC DEVICE

(71) Applicant: ZTE CORPORATION, Shenzhen (CN)

(72) Inventors: Gang Qiu, Shenzhen (CN); Feng Wu, Shenzhen (CN); Lingbin Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 288 days.

(21) Appl. No.: 18/706,237

(22) PCT Filed: Oct. 17, 2022

(86) PCT No.: PCT/CN2022/125766
§ 371 (c)(1),
(2) Date: Apr. 30, 2024

(87) PCT Pub. No.: WO2023/078077
PCT Pub. Date: May 11, 2023

(65) Prior Publication Data
US 2025/0007656 A1    Jan. 2, 2025

(30) Foreign Application Priority Data
Nov. 5, 2021    (CN) .......................... 202111308497.X

(51) Int. Cl.
*H04L 5/00*        (2006.01)
*H04W 72/0453*     (2023.01)

(52) U.S. Cl.
CPC ............ *H04L 5/001* (2013.01); *H04L 5/0098* (2013.01); *H04W 72/0453* (2013.01)

(58) Field of Classification Search
CPC ......... H04L 5/001; H04L 5/0098; H04L 5/00; H04W 72/0453; H04W 72/04; Y02D 30/70
See application file for complete search history.

(56) References Cited

U.S. PATENT DOCUMENTS

2011/0159903 A1*   6/2011   Yuk ................... H04W 72/0453
                                                  455/507
2015/0043523 A1*   2/2015   Luo ......................... H04B 1/713
                                                  370/330
(Continued)

FOREIGN PATENT DOCUMENTS

CN        103037445 A   *   4/2013   ............ H04W 72/23
CN        105453475 A   *   3/2016   ............ H04L 5/001
(Continued)

OTHER PUBLICATIONS

3GPP TS 38.331 V15.15.0 (Sep. 2021), 3rd Generation Partnership Project; Technical Specification Group Radio Access Network; NR; Radio Resource Control (RRC) protocol specification (Release 15), Sep. 2021. (Year: 2021).*
(Continued)

*Primary Examiner* — Michael A Keller
(74) *Attorney, Agent, or Firm* — Vivacqua Crane, PLLC

(57) ABSTRACT

Disclosed in the present disclosure are a carrier aggregation method and apparatus, and an electronic device. The method is applied to a base station and includes: acquiring basic information of a carrier within a preset period in response to determining that discrete carrier segments present in the carrier; determining a required number of pieces of common information of the carrier segments according to the basic information; and in response to a current number of pieces of common information being inconsistent with the required number, disabling or enabling the common information of at least one of the carrier segments to make the current number
(Continued)

of pieces of common information consistent with the required number of pieces of common information.

13 Claims, 4 Drawing Sheets

(56)                    References Cited

U.S. PATENT DOCUMENTS

2020/0337005 A1 *  10/2020  Bengtsson ........ H04W 56/0015
2021/0266896 A1 *   8/2021  Choi ........................ H04L 5/001
2025/0089033 A1 *   3/2025  Wang ................... H04W 72/232
2025/0310939 A1 *  10/2025  Takeda .................. H04L 5/0053

FOREIGN PATENT DOCUMENTS

CN          107872292 A  *  4/2018  ............ H04W 72/21
CN          113727449 A  *  11/2021  ............ H04W 72/23

OTHER PUBLICATIONS

International Searching Authority. International Search Report and Written Opinion for PCT Application No. PCT/CN2022/125766 and English translation, mailed Jan. 18, 2023, pp. 1-10.
European Patent Office. Extended European Search Report for EP Application No. 22889102.4, mailed Oct. 16, 2025, pp. 1-8.

* cited by examiner

CARRIER AGGREGATION METHOD AND APPARATUS, AND ELECTRONIC DEVICE

CROSS-REFERENCE TO RELATED APPLICATION

This application is a national stage filing under 35 U.S.C. § 371 of international application number PCT/CN2022/125766, filed Oct. 17, 2022, which claims priority to Chinese patent application No. 202111308497.X filed Nov. 5, 2021. The contents of these applications are incorporated herein by reference in their entirety.

TECHNICAL FIELD

The present disclosure relates to the technical field of communication, and in particular, to a carrier aggregation method and apparatus, and an electronic device.

BACKGROUND

Carrier Aggregation (CA) means that a base station aggregates two or more component carriers (CCs) together to provide services for a User Equipment (UE), such that a single-user throughput can be significantly improved. However, to ensure the security and accuracy of discrete component carriers in the transmission process, it is necessary to enable corresponding common information and other common overheads for each of the component carrier. Especially where there are multiple discrete component carriers, the common overheads occupy a large portion of available bandwidth of the carriers, resulting in a waste of common resources in the discrete spectrum and affecting the effective spectrum utilization. However, no effective scheme has been proposed to optimize common overheads for non-contiguous carriers in related technologies.

SUMMARY

The following is a summary of the subject matter to be set forth in this description, which is not intended to limit the scope of protection of the claims.

Embodiments of the present disclosure provide a carrier aggregation method and apparatus, and an electronic device.

In accordance with a first aspect of the present disclosure, in an embodiment provided is a carrier aggregation method, including: acquiring basic information of a carrier within a preset period in response to determining that discrete carrier segments present in the carrier; determining a required number of pieces of common information of the carrier segments according to the basic information; and in response to a current number of pieces of common information being inconsistent with the required number, disabling or enabling the common information of at least one of the carrier segments to make the current number of pieces of common information consistent with the required number of pieces of common information.

In accordance with a second aspect of the present disclosure, in an embodiment provided is a carrier aggregation apparatus, including a configuration module, an acquisition module, a determining module, an execution module, an execution module, and an addition module. The configuration module is configured to configure, in response to present of discrete carrier segments in a carrier, common information for each of the carrier segments; the acquisition module is configured to acquire basic information of a carrier within a preset period in response to determining that discrete carrier segments present in the carrier; the determining module is configured to determine a required number of pieces of common information according to the basic information; the execution module is configured to disable or enabling the common information of at least one of the carrier segments to make a current number of pieces of common information consistent with the required number of pieces of common information; and the addition module is configured to add the carrier segment of which the common information is disabled or enabled to the carrier as a Secondary Carrier Component (SCC) in response to a service requirement.

In accordance with a third aspect of the present disclosure, in an embodiment provided is an electronic device, including a memory, a processor, and a computer program stored in the memory and executable by the processor. The computer program, when executed by the processor, causes the processor to implement the carrier aggregation in accordance with the embodiments of the present disclosure.

In accordance with a fourth aspect of the present disclosure, in an embodiment provided is a computer-readable storage medium, storing a computer program which, when executed by a processor, causes the processor to implement the carrier aggregation method in accordance with the embodiments of the present disclosure.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims, and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, and are not intended to limit the technical schemes of the present disclosure.

DETAILED DESCRIPTION

Figure 1:
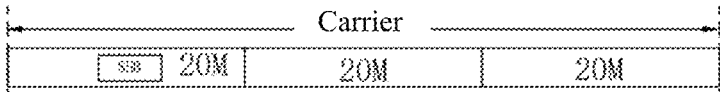
FIG. 1 is a schematic structural diagram of a contiguous carrier.

To make the objects, technical schemes, and advantages of the present disclosure clear, the present disclosure is described in further detail in conjunction with accompanying drawings and examples. It should be understood that the embodiments described herein are merely used for illustrating the present disclosure, and are not intended to limit the present disclosure.

It should be understood that in the description of the embodiments of the present disclosure, the terms such as "first", "second" and the like used herein are merely used for distinguishing technical features, and are not intended to indicate or imply relative importance, or implicitly point out the number of the indicated technical features, or implicitly point out a precedence order of the indicated technical features. The term "at least one" means one or more, and the term "a plurality of" means two or more. The term "and/or" is used for describing an association between associated objects and representing that three associations may exist. For example, "A and/or B" may indicate that only A exists, only B exists, and both A and B exist, where A and B may be singular or plural. The character "/" generally indicates an "or" relation between the associated objects. "At least one of" and similar expressions refer to any combination of items listed, including one item or any combination of a plurality of items. For example, at least one of a, b, or c may represent a, b, c, "a and b", "a and c", "b and c", or "a, b, and c", where a, b, and c may be singular or plural.

In addition, the technical features involved in various embodiments of the present disclosure described below can be combined with each other if not in collision with each other.

Carrier aggregation involved in the embodiments of the present disclosure is applied under 5th Generation Mobile Communication Technology (5G) standards, and a base station aggregates a plurality of component carriers together to realize larger transmission bandwidth and effectively improve the uplink and downlink transmission rates. However, in practical applications, due to the continuous coexistence of multiple standards in a communication system, the spectrum is becoming more and more discrete, which makes the cell management mode gradually fragmented. Carrier aggregation can effectively make carriers less discrete, optimize the unified management of cells, and improve the transmission rate. In some embodiments, a classic scenario of carrier aggregation is to aggregate a plurality of non-contiguous carriers such that a single UE can achieve the sum of traffic peaks of the plurality of carriers.

With the development of communication technologies, especially under global 5G New Radio (NR) standards based on Orthogonal Frequency Division Multiplexing (OFDM), common resource overheads of the discrete spectrum occupy too many time-frequency resources in the process of carrier aggregation. In addition, under 5G standards, one piece of common information (Synchronization Signal/Physical Broadcast Channel (SS/PBCH) block, SSB) includes: a Primary Synchronization Signal (PSS), a Secondary Synchronization Signal (SSS), and a Physical Broadcast Channel (PBCH). The PBCH carries Master Information Block (MIB) information. In addition, one SSB corresponds to one set of System Information (SI), and SI includes SIB-1 (System Information Block) and other SIB-n, which also occupy more time-frequency resources. Because the SSB and the SI are mainly used for UE access, the detection of common information is not needed for an SCC of a certain UE in the process of carrier aggregation. Therefore, common resource overheads can be reduced by adjusting the number of SSBs in the process of carrier aggregation.

In some embodiments, contiguous and non-contiguous spectrum cases are analyzed with an actual effective bandwidth of 60M as an example. FIG. 1 is a schematic structural diagram of a contiguous carrier, i.e., a contiguous 60M carrier, where a 60M carrier cell may be set up, and an SSB including a PSS, an SSS, and an MIB may be configured. Time-frequency resources occupied by the SSB are related to the occupied Resource Block (RB), symbol, slot, and period. It is assumed that the SSB occupies four symbols in time domain and 20 RBs in frequency domain. Because the cell has a bandwidth of 20M and a subcarrier spacing of 30K Hz, the number of RBs in the cell is 51. In addition, it is assumed that eight SSBs are configured in time domain within the 5 ms period of the cell. According to the cell bandwidth relationship of the frequency band below 6G (FR1) under 5G protocols, the proportion of time-frequency resources occupied by the SSBs is about 20 (RB)*4 (symbol)*8 (SSB)/5 (ms)*2 (slot)*162 (RB)*14 (symbol)=2.8%.

Figure 2:
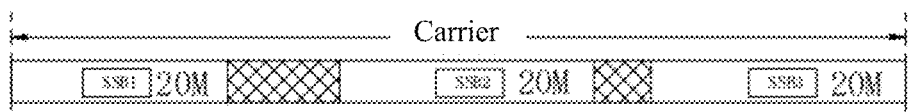
FIG. 2 is a schematic structural diagram of a non-contiguous carrier.

FIG. 2 is a schematic structural diagram of a non-contiguous carrier, i.e., a non-contiguous 60M carrier, which is divided into three 20M discrete carrier segments, where three carrier cells need to be set up, and a set of SSBs needs to be configured for each cell. In this case, similarly, under the conditions described above, on the same 60M bandwidth, the proportion of time-frequency resources occupied by the SSBs is 3 (carrier number)*20 (RB)*4 (symbol)*8 (SSB)/3 (carrier number)*5 (ms)*2 (slot)*51 (RB)*14 (symbol)=9%.

Therefore, for the same 60M bandwidth, there is a great difference between the proportions of time-frequency resources occupied by the contiguous spectrum and the non-contiguous spectrum. As a result, in some cases, common resource overheads are too high in the process of carrier aggregation of the discrete spectrum, greatly affecting the effective spectrum utilization.

In view of the above, the embodiments of the present disclosure provides a carrier aggregation method and apparatus, an electronic device, and a computer-readable storage medium, where basic information of a carrier is acquired periodically, then a required number of pieces of common information of carrier segments is determined according to the basic information, and the common information of at least one of the carrier segments is disabled or enabled to make a current number of pieces of common information consistent with the required number of pieces of common information. In this way, common resource overheads of the discrete spectrum in the process of carrier aggregation are reduced, thereby improving the effective spectrum utilization.

Figure 3:
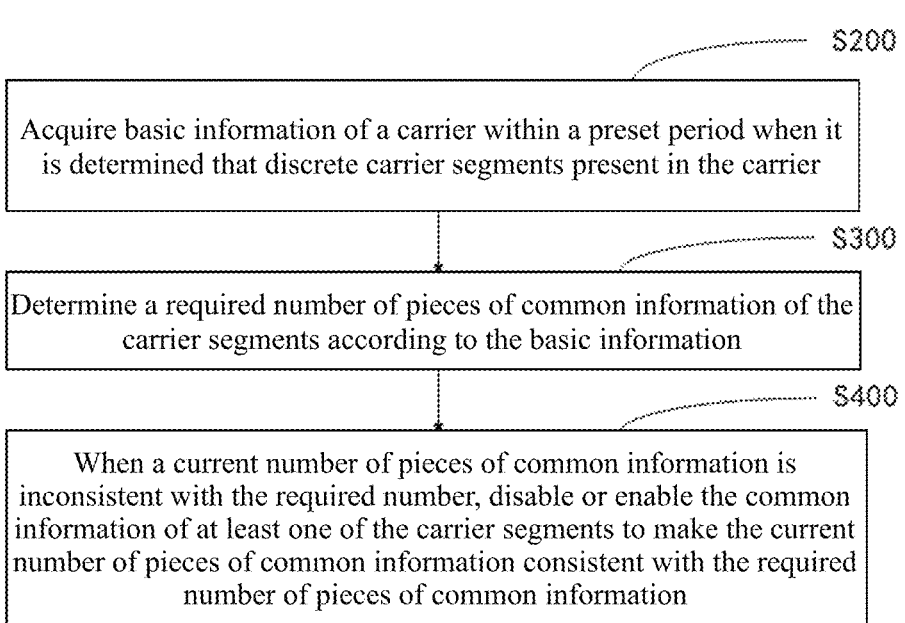
FIG. 3 is a schematic flowchart of a carrier aggregation method according to an embodiment of the present disclosure.
Figures 4, 5:
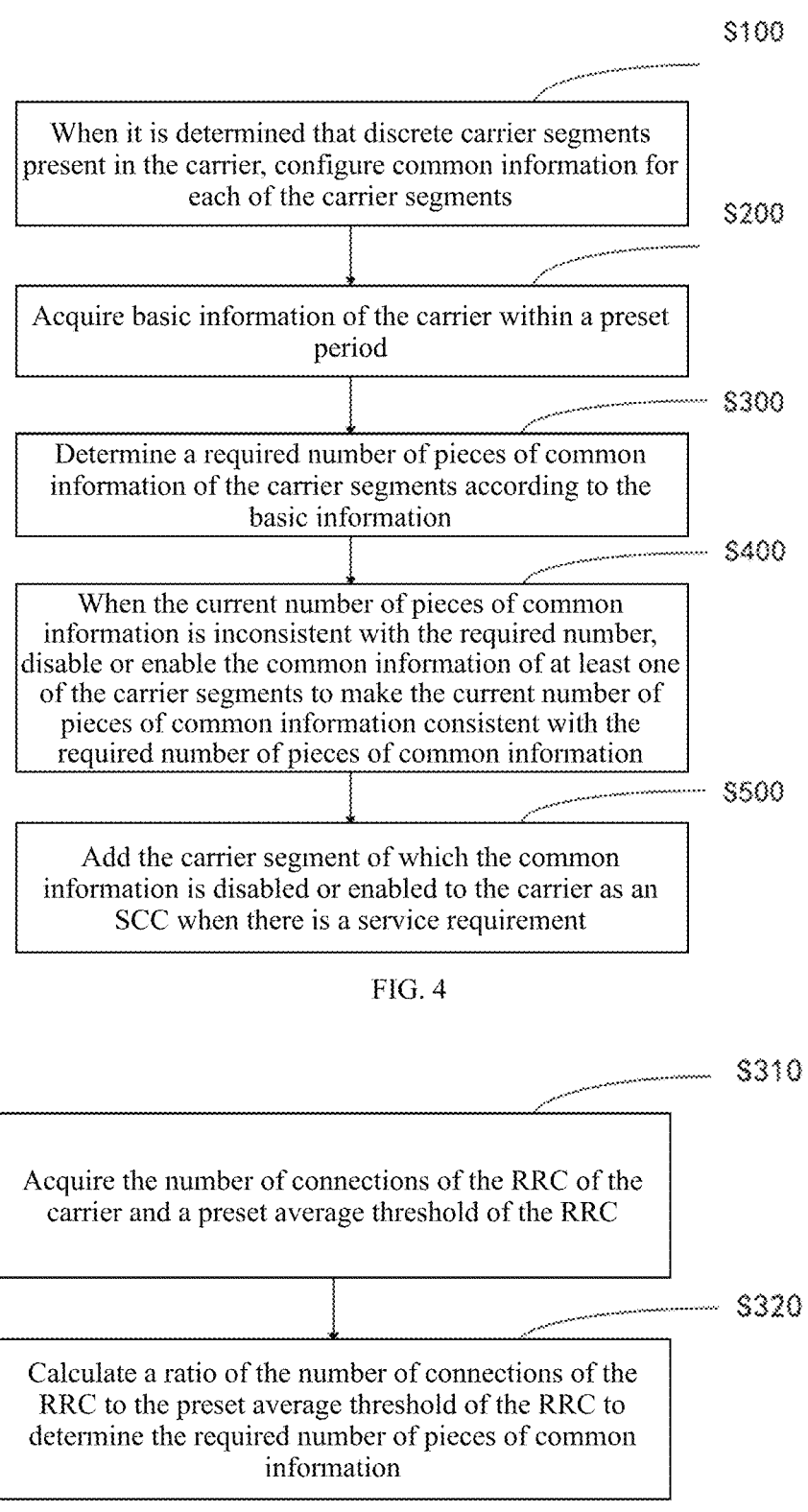
FIG. 4 is a schematic flowchart of a carrier aggregation method according to another embodiment of the present disclosure.
FIG. 5 is a schematic diagram of another implementation process of S300 in FIG. 3.

FIG. 3 and FIG. 4 show a process of a carrier aggregation method according to an embodiment of the present disclosure. As shown in FIG. 4, the carrier aggregation method in the embodiment of the present disclosure includes the following steps S100 to S500.

At S100, when it is determined that discrete carrier segments exist in a carrier, common information is configured for each of the carrier segments.

In practical applications, before sending a carrier signal, the base station determines whether there are discrete carrier segments in the carrier; and if there are discrete carrier segments, the base station determines a number of discrete carrier segments included in the carrier. In some embodiments, the discrete carrier structure shown in FIG. 2 is a 75M bandwidth spectrum belonging to the FR1 band, but only 60M is available, which is divided into three carrier segments each having a bandwidth of 20M.

After the number of discrete carrier segments is determined, it is necessary to configure common information, i.e., an SSB, for each carrier segment, to realize signal synchronization with a terminal device. In some embodiments, three SSBs need to be set in the carrier structure shown in FIG. 2. The SSBs are SSB1, SSB2, and SSB3 in an order from low frequency to high frequency.

At S200, basic information of the carrier is acquired within a preset period.

It should be understood that the basic information includes, but not limited to, a current number of pieces of common information, a number of connections of Radio Resource Control (RRC) of the carrier, and a number of consecutive carrier segments in the carrier. The current number of pieces of common information is the number of carrier segments of which the common information is enabled, and the value of the number of connections of the RRC is constantly changing with different user information broadcast by the base station. Therefore, it is necessary to repeatedly collect the basic information of the carrier within the preset period to ensure that the basic information of the carrier can be updated in a timely manner. In some embodiments, the preset period is one hour, and the number of carrier segments of which the common information is enabled and the number of connections of the RRC are counted and updated every hour, to ensure that the acquired basic information of the carrier can accurately reflect the current SSB demand.

At S300, a required number of pieces of common information of the carrier segments is determined according to the basic information.

FIG. 5 is a schematic diagram of an implementation process of S300. As shown in FIG. 5, S300 includes at least the following steps S310 to S320.

At S310, the number of connections of the RRC of the carrier and a preset average threshold of the RRC are acquired.

It should be understood that RRC refers to the management, control, and scheduling of radio resources of carrier segments based on 5G protocols, to fully utilize the limited radio resources in the network as much as possible while meeting quality of service (QOS) requirements, such that radio signals can reach the planned coverage areas, thereby improving the service capacity and resource utilization as much as possible. Only the carrier segment with an RRC connection can become a Primary Carrier Component (PCC). A larger number of RRC connections can better meet a high-traffic service requirement of wireless communication, but also brings higher common resource overheads. Therefore, the number of RRC connections can effectively reflect the resource utilization of the current carrier segment. By comparing the number of RRC connections with the preset average threshold of the RRC, it can be accurately determined whether the current number of RRC connections matches the service requirement.

At S320, a ratio of the number of connections of the RRC to the preset average threshold of the RRC is calculated to determine the required number of pieces of common information.

It should be understood that by calculating the ratio of the number of connections of the RRC and the preset average threshold of the RRC, an average number of SSBs in the current carrier that are required for sending data through RRC can be intuitively acquired. With the use of this ratio as the required number of SSBs, the number of connections of the RRC and the resource usage can be comprehensively considered, and therefore the actual SSB demand can be obtained. In some embodiments, if the number of connections of the RRC increases, it indicates that more SSBs need to be enabled in a carrier segment, and RRC connections are established in the carrier segment, to improve the efficiency of data transmission and realize load balancing.

A calculation formula for the required number of pieces of common information, defined as $n_{need}$, is as follows:

$$n_{need} = RRC_{total}/RRC_{average},$$

where $RRC_{total}$ represents the number of connections of the RRC, and $RRC_{average}$ represents the preset average threshold of the RRC.

It should be understood that the required number of pieces of common information may also be obtained according to the number of PCCs in the carrier and resource usage in the carrier segments, which will not be described in detail herein.

Figure 6:
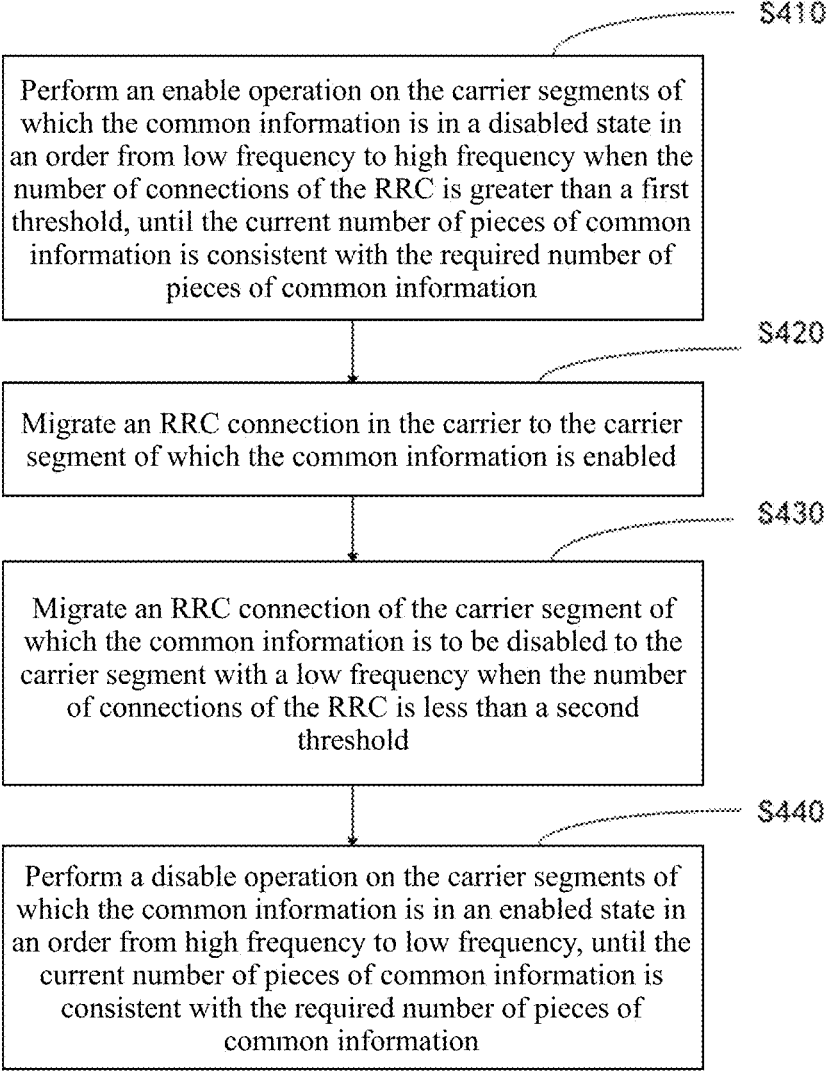
FIG. 6 is a schematic diagram of another implementation process of S400 in FIG. 3.

At S400, when the current number of pieces of common information is inconsistent with the required number of pieces of common information, the common information of at least one of the carrier segments is disabled or enabled to make the current number of pieces of common information consistent with the required number of pieces of common information FIG. 6 is a schematic diagram of an implementation process of S400. As shown in FIG. 6, S400 includes at least the following steps S410 to S440.

At S410, an enable operation is performed on the carrier segments of which the common information is in a disabled state in an order from low frequency to high frequency when the number of connections of the RRC is greater than a first threshold, until the current number of pieces of common information is consistent with the required number of pieces of common information.

It should be understood that the number of RRC connections is compared with the first threshold, and when the number of RRC connections reaches a certain number, the number of carrier segments of which the common information is in the enabled state is increased to allow more carrier segments to participate in service transmission, so as to prevent traffic congestion. This effectively improves the transmission efficiency of service data, and load-balances resource utilization of the carrier segments.

It should be understood that enabling the SSBs in the order from low frequency to high frequency can make full use of the carrier segments with low frequencies, to prevent the carrier segments with low frequencies from remaining in an SSB disabled state for a long time to affect the efficiency of service processing and transmission by the base station.

In actual applications, because the number of connections of the RRC is greater than the first threshold in this case, the required number of pieces of common information $n_{need}$ is greater than the current number of pieces of common information $n_{have}$. Therefore, the number of carrier segments of which the common information needs to be enabled, defined as $n_{open}$, can be calculated using the following calculation formula according to the required number of pieces of common information $n_{need}$ and the current number of pieces of common information $n_{have}$:

$$n_{open} = RRC_{total}/RRC_{average} - n_{have},$$

where $n_{have}$ represents the current number of pieces of common information.

At S420, an RRC connection in the carrier is migrated to the carrier segment of which the common information is enabled.

It should be understood that a load balance of RRC connections can be effectively realized by migrating the RRC connection to the carrier segment of which the common information is enabled, so as to prevent the carrier segments from being abnormal to affect the stability of RRC connections and the service continuity.

At S430, an RRC connection of the carrier segment of which the common information is to be disabled is migrated to the carrier segment with a low frequency when the number of connections of the RRC is less than a second threshold.

It should be understood that the number of RRC connections is compared with the second threshold, and when the number of RRC connections decreases to a certain number, the number of carrier segments of which the common information is in the enabled state is reduced, so as to prevent the SSBs from occupying too many common resources. This effectively improves the spectrum utilization, and load-balances resource utilization of the carrier segments.

It should be understood that before an SSB in a carrier segment is disabled, RRC connections of the carrier segment need to be migrated to a carrier segment with a low frequency, to effectively prevent the RRC connections from being interrupted or disturbed when the carrier segment is changed from a PCC to an SCC, thereby ensuring the service continuity.

At S440, a disable operation is performed on the carrier segments of which the common information is in an enabled state in an order from high frequency to low frequency, until the current number of pieces of common information is consistent with the required number of pieces of common information.

It should be understood that disabling SSBs in the order from high frequency to low frequency can avoid frequent service transmission of the carrier segments with high frequencies and ensure the response speed of the carrier segments with high frequencies.

In actual applications, because the number of connections of the RRC is less than the second threshold in this case, the required number of pieces of common information $n_{need}$ is less than the current number of pieces of common information $n_{have}$. Therefore, the number of carrier segments of which the common information needs to be disabled, defined as $n_{close}$, can also be calculated using the following calculation formula according to the required number of pieces of common information $n_{need}$ and the current number of pieces of common information $n_{have}$:

$$n_{close} = n_{have} - RRC_{total}/RRC_{average}.$$

In some embodiments, using the discrete carrier structure shown in FIG. 2 as an example, because there are three discrete carrier segments, the basic information of the carrier is acquired within the preset period: the number of connections of the RRC of the carrier being 200, the preset average threshold of the RRC of each 20M carrier segment being 150, and the second threshold of the RRC being 300. Therefore, the required number of pieces of common information is 200/150=2 (which is calculated by rounding up).

Because the current number of pieces of common information is 3, and the number of connections of the RRC of the carrier is less than the second threshold of the RRC, the number of carrier segments of which the common information is to be disabled can be calculated as 3−2=1. Therefore, SSB3 is disabled according to the order from high frequency to low frequency. In this way, on the premise of ensuring the service continuity, common resource overheads occupied by the SSBs can be effectively reduced by reducing the current number of SSBs.

At S500, the carrier segment of which the common information is disabled or enabled is added to the carrier as an SCC when there is a service requirement.

It should be understood that after common information of a carrier segment is disabled or enabled, resource utilization of the carrier segment is low. Therefore, the carrier segment of which the common information is disabled or enabled is used as an SCC, such that in the case of a high-traffic service, a PCC can be quickly aggregated with the SCC as required to acquire more bandwidth resources, thereby effectively avoiding congestion and excessively low rates. In practical applications, to increase available bandwidth resources of the SCC, the carrier segment of which the common information is disabled should be preferentially added as an SCC, and the carrier segment of which the common information is enabled should be secondly added as an SCC.

The carrier aggregation method provided in the embodiments of the present disclosure is applicable to a Long Term Evolution (LTE) network scenario, a 5G network scenario, and a hybrid LTE/5G network scenario, and can reduce common resource overheads of the discrete spectrum in the process of carrier aggregation, improve the effective spectrum utilization, and improve the QoS of wireless network.

Figure 7:
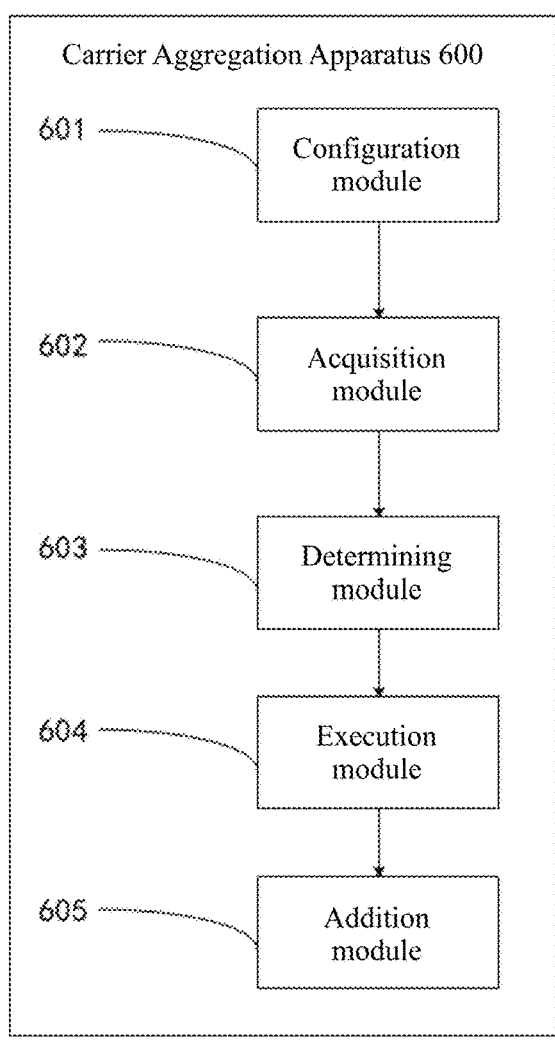
FIG. 7 is a structural diagram of a carrier aggregation apparatus according to an embodiment of the present disclosure.

FIG. 7 is a schematic structural diagram of a carrier aggregation apparatus 600 according to an embodiment of the present disclosure. The entire process of the carrier aggregation method provided in the embodiments of the present disclosure relates to the following modules in the carrier aggregation apparatus 600: a configuration module 601, an acquisition module 602, a determining module 603, an execution module 604, and an addition module 605.

The configuration module 601 is configured for configuring, when it is determined that discrete carrier segments exist in a carrier, common information for each of the carrier segments.

The acquisition module 602 is configured for acquiring basic information of the carrier within a preset period.

The determining module 603 is configured for determining a required number of pieces of common information according to the basic information.

The execution module 604 is configured for disabling or enabling the common information of at least one of the carrier segments to make a current number of pieces of common information consistent with the required number of pieces of common information.

The addition module 605 is configured for adding the carrier segment of which the common information is disabled or enabled to the carrier as an SCC when there is a service requirement.

It should be noted that the information exchange and execution processes between the above modules of the apparatus are based on the same idea as the method embodiments of the present disclosure. For functions and technical effects of the modules, reference may be made to the descriptions in the method embodiments, and the details will not be repeated herein.

Figure 8:
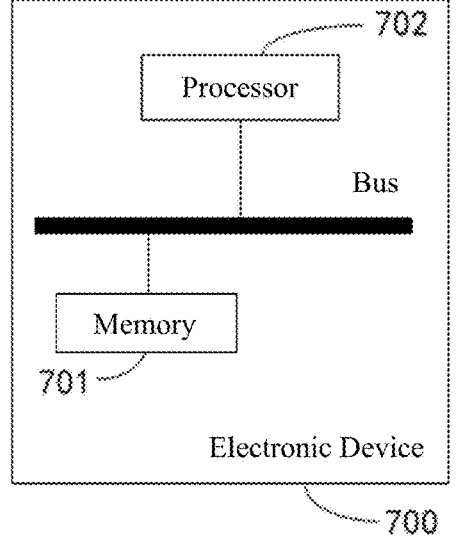
FIG. 8 is a schematic structural diagram of an electronic device according to an embodiment of the present disclosure.

FIG. 8 shows an electronic device 700 according to an embodiment of the present disclosure. The electronic device 700 includes, but not limited to, a memory 701, configured for storing a program; and a processor 702, configured for executing the program stored in the memory 701, where the program, when executed by the processor 702, causes the processor 702 to implement the carrier aggregation method described above.

The processor 702 and the memory 701 may be connected by a bus or in other ways.

The memory 701, as a non-transitory computer-readable storage medium, may be configured for storing a non-transitory software program and a non-transitory computer-executable program, for example, the carrier aggregation method described in any one of the embodiments of the present disclosure. The processor 702 runs the non-transitory software program and the non-transitory computer-executable program stored in the memory 701, to implement the carrier aggregation method.

The memory 701 may include a program storage area and a data storage area. The program storage area may store an operating system, and an application required by at least one function. The data storage area may store data and the like required for executing the carrier aggregation method. In addition, the memory 701 may include a high-speed random access memory, and may also include a non-transitory memory, e.g., at least one magnetic disk storage device, flash memory device, or other non-transitory solid-state storage device. In some implementations, the memory 701 includes memories located remotely from the processor 702, and the remote memories may be connected to the processor 702 via a network. Examples of the network include, but not limited to, the Internet, an intranet, a local area network, a mobile communication network, and combinations thereof.

The non-transitory software program and instructions required to implement the carrier aggregation method are stored in the memory 701 which, when executed by one or more processors 702, cause one or more processors 702 to implement the carrier aggregation method according to any one of the embodiments of the present disclosure.

An embodiment of the present disclosure provides a storage medium, storing a computer-executable instruction which, when executed by a processor, causes the processor to implement the carrier aggregation method.

In an embodiment, the storage medium stores a computer-executable instruction which, when executed by one or more control processors 702, for example, by a processor 702 in the electronic device 700, may cause the one or more processors 702 to implement the carrier aggregation method according to any one of the embodiments of the present disclosure.

The embodiments described above are merely examples. The units described as separate components may or may not be physically separated, i.e., may be located in one place or may be distributed over a plurality of network units. Some or all of the modules may be selected according to actual needs to achieve the objects of the scheme of this embodiment.

In the embodiments of the present disclosure, basic information of a carrier is acquired within a preset period when it is determined that discrete carrier segments exist in the carrier; a required number of pieces of common information of the carrier segments is determined according to the basic information; and when a current number of pieces of common information is inconsistent with the required number, the common information of at least one of the carrier segments is disabled or enabled to make the current number of pieces of common information consistent with the required number of pieces of common information. The schemes of the embodiments of the present disclosure can reduce common resource overheads of the discrete spectrum in the process of carrier aggregation, has the advantage of improving the effective spectrum utilization, and is especially suitable for adjusting the common resource overheads of the discrete spectrum periodically as required in a case where a base station transmits discrete carrier segments, thereby improving the QoS of the wireless network.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some embodiments of the present disclosure have been described above, the present disclosure is not limited to the implementations described above. Those having ordinary skills in the art can make various equivalent modifications or replacements without departing from the scope of the present disclosure. Such equivalent modifications or replacements fall within the scope defined by the claims of the present disclosure.

What is claimed is:

1. A carrier aggregation method, applied to a base station, the method comprising:

acquiring basic information of a carrier within a preset period in response to determining that discrete carrier segments present in the carrier;

determining a required number of pieces of common information of the carrier segments according to the basic information; and in response to a current number of pieces of common information being inconsistent with the required number, disabling or enabling the common information of at least one of the carrier segments to make the current number of pieces of common information consistent with the required number of pieces of common information.

2. The method of claim 1, prior to acquiring basic information of a carrier within a preset period, the method further comprising:

configuring common information for each of the carrier segments in response to present of discrete carrier segments in the carrier.

3. The method of claim 2, after disabling or enabling the common information of at least one of the carrier segments to make the current number of pieces of common information consistent with the required number of pieces of common information, the method further comprising:

adding the carrier segment of which the common information is disabled or enabled to the carrier as a Secondary Carrier Component (SCC) in response to a service requirement.

4. The method of claim 1, wherein the basic information of the carrier comprises the current number of pieces of common information, a number of connections of Radio Resource Control (RRC) of the carrier, and a number of consecutive carrier segments in the carrier.

5. The method of claim 4, wherein determining a required number of pieces of common information of the carrier segments according to the basic information comprises:

obtaining the required number of pieces of common information according to the number of connections of the RRC of the carrier and a preset average threshold of the RRC.

6. The method of claim 5, wherein the required number of pieces of common information is equal to a ratio of the number of connections of the RRC to the preset average threshold of the RRC.

7. The method of claim 4, wherein disabling or enabling the common information of at least one of the carrier segments to make the current number of pieces of common information consistent with the required number of pieces of common information comprises:

performing an enable operation on the carrier segments of which the common information is in a disabled state in an order from low frequency to high frequency in response to the number of connections of the RRC being greater than a first threshold, until the current number of pieces of common information is consistent with the required number of pieces of common information.

8. The method of claim 7, after performing an enable operation on the carrier segments of which the common information is in a disabled state in an order from low frequency to high frequency in response to the number of connections of the RRC being greater than a first threshold, the method further comprising:

migrating an RRC connection in the carrier to the carrier segment of which the common information is enabled.

9. The method of claim 7, disabling or enabling the common information of at least one of the carrier segments to make the current number of pieces of common information consistent with the required number further comprising:

performing a disable operation on the carrier segments of which the common information is in an enabled state in an order from high frequency to low frequency in response to the number of connections of the RRC being less than a second threshold, until the current number of pieces of common information is consistent with the required number of pieces of common information.

10. The method of claim 9, prior to performing a disable operation on the carrier segments of which the common information is in an enabled state in an order from high frequency to low frequency in response to the number of connections of the RRC being less than a second threshold, the method further comprising:

migrating an RRC connection of the carrier segment of which the common information is to be disabled to the carrier segment with a low frequency.

11. A carrier aggregation apparatus, comprising:

a configuration module, configured to configure, in response to present of discrete carrier segments in a carrier, common information for each of the carrier segments;

an acquisition module, configured to acquire basic information of a carrier within a preset period in response to determining that discrete carrier segments present in the carrier;

a determining module, configured to determine a required number of pieces of common information according to the basic information;

an execution module, configured to disable or enabling the common information of at least one of the carrier segments to make a current number of pieces of common information consistent with the required number of pieces of common information; and an addition module, configured to add the carrier segment of which the common information is disabled or enabled to the carrier as a Secondary Carrier Component (SCC) in response to a service requirement.

12. An electronic device, comprising a memory, a processor, and a computer program stored in the memory and executable by the processor, wherein the computer program, when executed by the processor, causes the processor to perform the carrier aggregation method of claim 1.

13. A non-transitory computer-readable storage medium, storing a computer program which, when executed by a processor, causes the processor to perform the carrier aggregation method of claim 1.

* * * * *